(12) United States Patent
Lee et al.

(10) Patent No.: US 6,762,817 B2
(45) Date of Patent: Jul. 13, 2004

(54) LIQUID CRYSTAL DISPLAY DEVICE HAVING IMPROVED STRUCTURE OF INJECTION OPENING

(75) Inventors: Seung-Joo Lee, Gyeongsangbuk Do (KR); Sie-Hyug Choi, Gyeongsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/303,912

(22) Filed: Nov. 26, 2002

(65) Prior Publication Data

US 2003/0098937 A1 May 29, 2003

(30) Foreign Application Priority Data

Nov. 27, 2001 (KR) ........................................ 2001-74365

(51) Int. Cl.⁷ .......................................... G02F 1/1339
(52) U.S. Cl. ....................................... 349/153; 349/154
(58) Field of Search ................................ 349/153, 189, 349/190

(56) References Cited

U.S. PATENT DOCUMENTS 5,508,834 A  *  4/1996  Yamada et al. ................ 349/58
5,936,695 A  *  8/1999  Hida et al. .................... 349/153

FOREIGN PATENT DOCUMENTS

JP          3-223721     * 10/1991     ......... G02F/1/1345

* cited by examiner

Primary Examiner—James A. Dudek
(74) Attorney, Agent, or Firm—McKenna Long & Aldridge LLP

(57) ABSTRACT

Encapsulation material is hardened by exposing with light in an amount sufficient to harden it. A black matrix and step compensating pattern are formed only in a part of an injection opening area through which liquid crystal is injected. In the region where the black matrix and step compensating pattern are formed encapsulation material is not filled. Therefore, light irradiation is not blocked by the black matrix and step compensating pattern when hardening the encapsulation material. In the region where the encapsulation material is filled, the encapsulation material is completely hardened by irradiating light without the black matrix and step compensating pattern and light leakage phenomenon is prevented by mounting the region in the outer case of the LCD device.

11 Claims, 4 Drawing Sheets

LIQUID CRYSTAL DISPLAY DEVICE HAVING IMPROVED STRUCTURE OF INJECTION OPENING

This application claims the benefit of Korean Patent Application No. 2001-74365 filed on Nov. 27, 2001, which is hereby incorporated by reference as if fully set forth herein.

BACKGROUND OF THE INVENTION

1. Field of the Invention

The present invention relates to a liquid crystal display (hereinafter, as LCD) device, and more particularly to the liquid crystal display device having an injection opening with an improved structure in which photo-sensitive encapsulation material and sufficiently exposed with the light in order to prevent the non-hardening of the encapsulation material caused by insufficient light exposure and prevent cracks of the encapsulation material caused by a step-compensating pattern of the injection opening.

2. Discussion of the Related Art

A liquid crystal display device is a transmission flat panel display device and is applied to various electronic equipments such as a mobile phone, PDA and notebook computer. Of the flat panel display devices, the LCD is most useful because of characteristics such as light weight, smaller size and a high image quality. Moreover, as the request for a digital TV or high image quality TV and panel type TV has increased research in the field of large area LCDs is more active.

Generally, LCDs may be divided into several types based on the operation mode of the liquid crystal molecules. Of the several types the TFT (Thin Film Transistor) type (TFT-LCD) is mainly used because of the fast response time and the reduced residual image.

Referring to FIG. 1, the TFT-LCD includes a lower substrate 3, upper substrate 5 and liquid crystal layer 17 therebetween. A plurality of gate lines 11 and data lines 13 are arranged in the vertical and horizontal directions on the lower substrate 3 to define a plurality of picture elements (pixels). The gate lines 11 and data lines 13 are electrically connected with an outer driving device (not shown) through pads 12 and 14, respectively, in a non-displaying region of the lower substrate 3. A TFT 15 is disposed in each pixel. A scanning signal is applied to the TFT 15 through the gate line 11, so that the TFT 15 is switched to apply an image signal to the liquid crystal layer 17 from the data line 13.

A sealing unit 7 on which sealing material is deposited is formed at the outer portion of the lower substrate 3 and upper substrate 5, thereby the lower substrate 3 and upper substrate 5 are attached each other. As shown in the figure, a black matrix 9 is formed in a region corresponding to the sealing unit 7 to block light through the region. The black matrix 9 is formed on the upper substrate 5. Though the black matrix 9 is disposed only the region corresponding to the sealing unit 7 in the figure, the black matrix 9 may be disposed such that the area between the pixels and TFT active area to block the light through non-displaying region.

In the figure, reference numeral 20 designates a liquid crystal injection opening for injecting liquid crystal between the attached lower and upper substrates 3 and 5. After injecting the liquid crystal through the liquid crystal injection opening 20, the liquid crystal injection opening 20 should be encapsulated by encapsulation material 22. Because the encapsulation material 22 is the photo-sensitive material, the encapsulation material 22 filled inside the liquid crystal injection opening 20 is hardened by exposure to light such as ultraviolet light.

A plurality of patterns 24 are disposed at the injection opening 20. The patterns 24 are the step-compensating patterns for preventing the generation of the defection in the TFT-LCD as steps are generated by the TFT or pixel electrode (not shown) formed in the pixel region.

Hereinafter, the TFT-LCD with the above composition will be described in more detail with reference to FIG. 2. In the figure, the region of the TFT-LCD where the image is actually displayed and the liquid crystal injection opening area are separated for convenience of description.

As shown in the figure, a gate electrode 31 is formed in the display region on the lower substrate 3 and a gate insulating layer 32 is deposited over the whole substrate 3. A semiconductor layer 34 is formed on the gate insulating layer 32 and activated by the scan signal applied to the gate electrode 31 to form a channel layer. Source/drain electrodes 36 are formed over the semiconductor layer 34. The source/drain electrodes 36 are electrically connected to the pixel electrode 38 in the region of the pixel where the image is actually displayed to apply the signal from the source/drain electrodes 36 to the pixel electrode 38 when the semiconductor layer 34 is activated. A passivation layer 39 is deposited over the source/drain electrodes 36 and the pixel electrode 38.

An alignment layer (not shown) is deposited over the passivation layer 39, to align the liquid crystal molecules in the liquid crystal layer 17.

A step compensating pattern 24 is formed on the gate insulating layer 32 in the liquid crystal injection opening area. This step compensating pattern 24 compensates the step caused by the pixel electrode 38. The step compensating pattern 24 is mainly made of the semiconductor material so that the pattern 24 is formed by the same process as the semiconductor layer 34 of the TFT.

The black matrix 9, a light-blocking element, and the color filter layer 42 are formed on the upper substrate 5. As shown in the figure, the black matrix 9, which is made of the material such as Cr, CrOx or Cr/CrOx, is formed in the TFT area of the pixel region, above the gate line, the data line, and the liquid crystal injection opening area. Further, a common electrode 44 is formed over the black matrix 9 and the color filter layer 42 to operate the liquid crystal molecules of the liquid crystal layer 17 as the signals are applied to the liquid crystal layer 17 through the TFT. The alignment layer is deposited on the common electrode 44 to align the liquid crystal molecules.

Spacers 50 are scattered between the lower substrate 3 and the upper substrate 5 to maintain a uniform cell gap and then the lower substrate 3 and the upper substrates 5 are sealed. The liquid crystal is injected between the sealed substrates 3 and 5 through the liquid crystal injection opening to form the liquid crystal layer 17. Thereafter, the liquid crystal injection opening is encapsulated with the encapsulation material.

FIG. 3 shows an enlarged structure of a liquid crystal injection opening encapsulated by the encapsulation material. As shown in the figure, a plurality of step compensating patterns 24 are formed over the whole area of the liquid crystal injection opening and the encapsulation material 22 is filled at the liquid crystal injection opening area. The encapsulation material 22 is depicted as the portion hatched by points.

Although the encapsulation material 22 is not filled in the portion on the step compensating patterns 24, as illustrated in FIG. 3 to indicate clearly the encapsulation material and the step compensating patterns 24, the encapsulation material in practice is also filled on the step compensating patterns 24, as illustrated in FIG. 2.

The encapsulation material 22 includes photo-sensitive material. Therefore, the encapsulation material 22 in the liquid crystal injection opening area is exposed to light, such as UV light, to harden the encapsulation material 22 to encapsulate the liquid crystal injection opening. In the other words, the UV light must be irradiated to the lower substrate 3 and upper substrate 5. As shown in the figure, the black matrix 9 is formed on the upper substrate 5 in the liquid crystal injection opening area. Accordingly, it is impossible to expose sufficiently the encapsulation material with UV light because of the black matrix 9 blocks light irradiated through the upper substrate 5. Generally, UV light having about 300 mj/cm$^2$ of light amount is needed to harden sufficiently the encapsulation material. However, the practical mount of UV light exposed to the encapsulation material is smaller than 300 mj/cm$^2$ because of the blocking caused by the black matrix 9. Because of this insufficient light amount, it is impossible to harden sufficiently the encapsulation material so that the non-hardening material may flow into the displaying region and a resultant spot is generated in the display region.

Further, in case of irradiating the UV light from or through the lower substrate 3, the UV light may be blocked by the step compensating patterns 24. Thus, encapsulation material is exposed with the UV light of an insufficient amount and, as a result, the exposed encapsulation material may not be hardened. Since the encapsulation material 22 in the vicinity of the step compensating pattern 24 is cracked along the pattern 24, in addition, serious defects are generated in the liquid crystal display device.

SUMMARY OF THE INVENTION

Accordingly, the present invention is directed to a liquid crystal display device having improved structure of injection opening that substantially obviates one or more of the problems due to limitations and disadvantages of the related art.

An advantage of the present invention is to provide a liquid crystal display device having an improved structure of injection opening, that facilitates hardening of the encapsulation material by exposure to a sufficient amount of light because a black matrix and a step compensating pattern are not formed in the injection opening area where the encapsulation material is filled.

Another advantage of the present invention is to provide a liquid crystal display device that can prevent light-leakage phenomenon by not-forming a black matrix by attaching the region where the encapsulation material is filled to an outer case of the LCD device.

Additional features and advantages of the invention will be set forth in the description which follows, and in part will be apparent from the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a liquid crystal display device having an improved structure of injection opening. The injection opening area is divided to two regions. Since the encapsulation material is filled only in the region where the black matrix and the step compensating pattern are not formed, blocking of light irradiation is not occurred by the black matrix and the step compensating pattern, in the light-hardening of the encapsulation material. Therefore, the perfect hardening of the encapsulation material is possible by the light irradiation of the sufficient amount of the light. The region where the encapsulation material is filled is attached to the outer case of the liquid crystal display device, thus to prevent the light transmission to the region.

Also, the present invention provides a liquid crystal display device having the above structure of the injection opening.

The step compensating pattern can be simultaneously formed with an identical material of the semiconductor layer of the thin film transistor and with metal of the gate electrode or source/drain electrode. The step compensating pattern can be formed in various shapes.

In the region where the encapsulation material is not filled, the black matrix and step compensating pattern can be formed and just a black matrix can be formed. Also, the step compensating pattern can be extended and formed to the region where the encapsulating material is filled.

It is to be understood that both the foregoing and general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Figure 1:
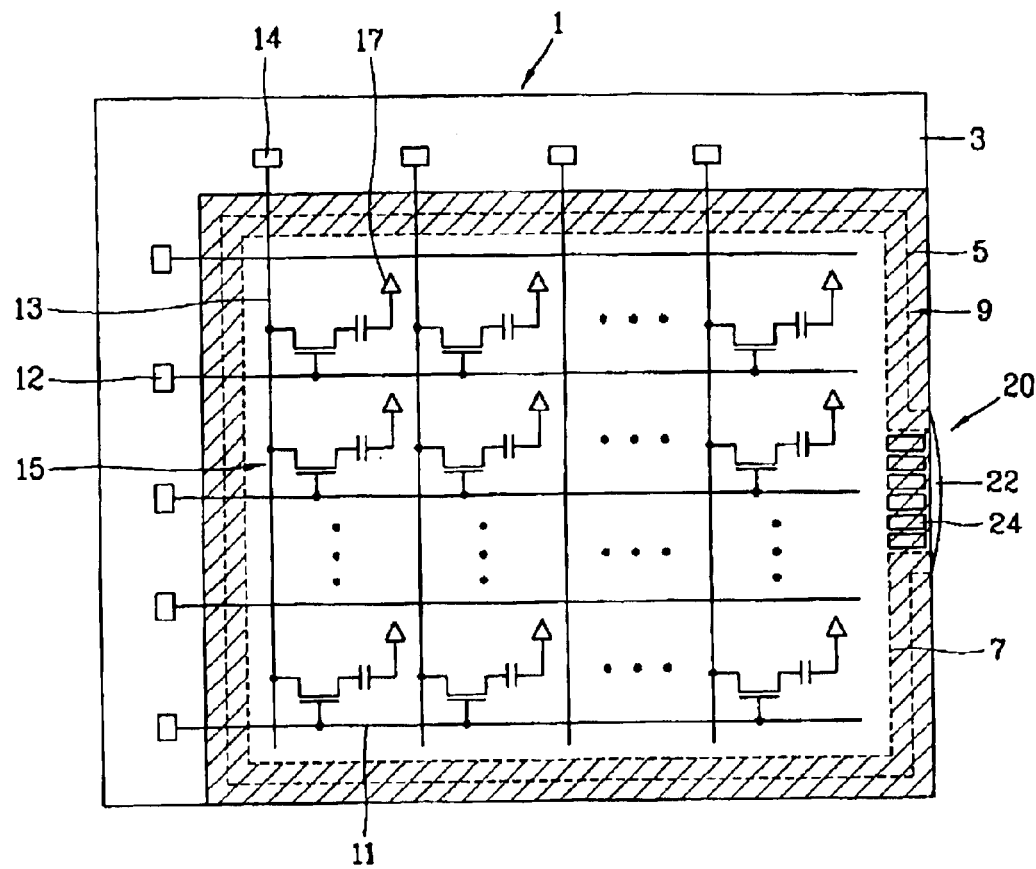
FIG. 1 is a plan view illustrating a structure of a general liquid crystal display (LCD) device.
Figure 2:
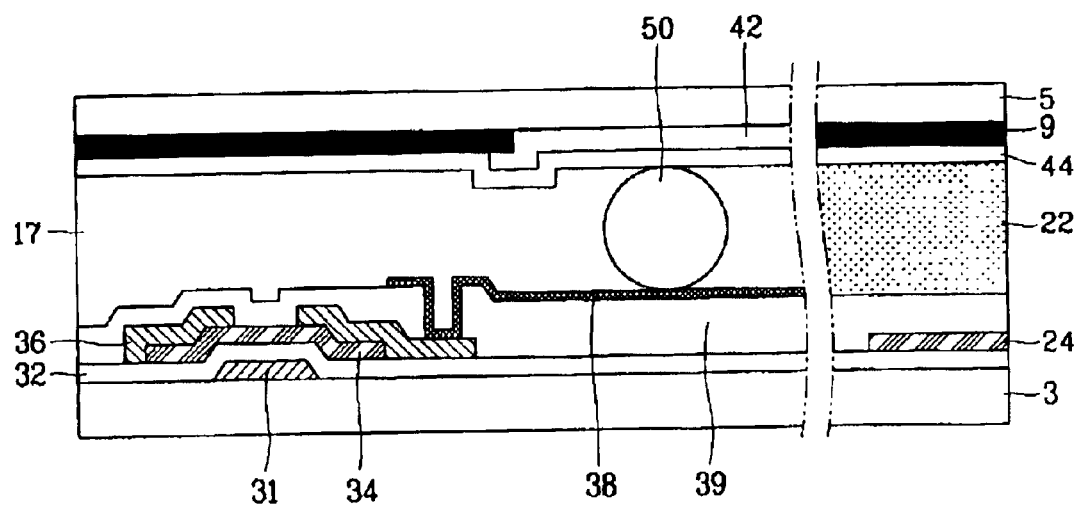
FIG. 2 is a cross-sectional view illustrating a structure of a pixel region and liquid crystal injection opening area of the related art LCD device.
Figure 3:
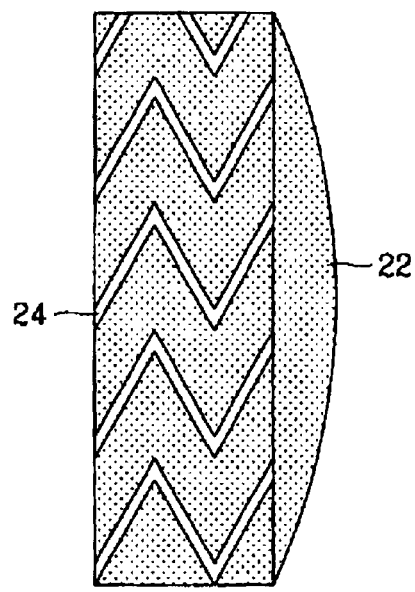
FIG. 3 is an enlarged plan view of a liquid crystal injection opening of the related art LCD device.
Figure 4:
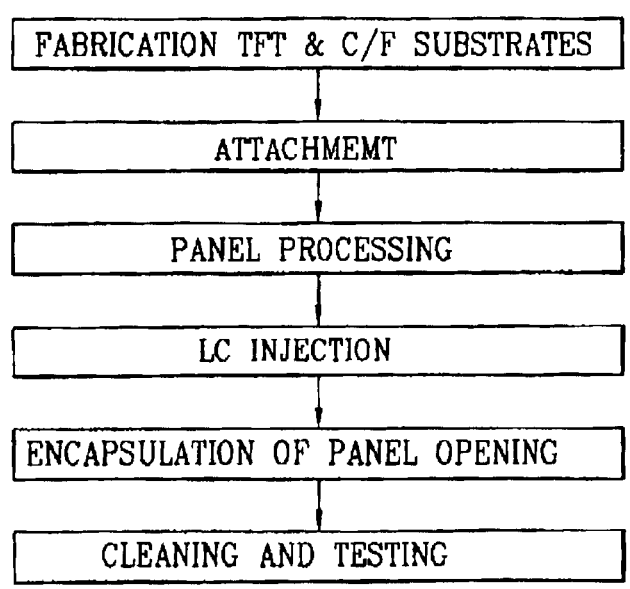
FIG. 4 is a view illustrating a fabricating process of a LCD device.

Generally, an LCD device is fabricated by process shown in FIG. 4. First, a TFT substrate is fabricated by forming thin film transistors and pixel electrodes on the lower substrate. A color filter substrate is fabricated by forming a black matrix, a color filter layer, and a common electrode over the upper substrate. A spacer is scattered and the sealing material is deposited over the TFT substrate. Subsequently, the TFT substrate and the color filter substrate are attached each other and sealed by compressing the color filter substrate and the TFT substrate.

Thereafter, the attached substrates are separated into the unit liquid crystal panels and then liquid crystal is injected to the unit liquid crystal panel through the liquid crystal injection opening using the capillary phenomenon in a vacuum chamber. After injecting liquid crystal, the liquid crystal injection opening is encapsulated with an encapsulation material, the encapsulated liquid crystal panel is cleaned and tested to fabricate completely the liquid crystal panel.

The liquid crystal opening is encapsulated by hardening the photo-sensitive encapsulation material, such as a photo-sensitive resin. The photo-sensitive encapsulation material is generally hardened by exposing with the light such as ultraviolet (UV) light. In the present invention, in particular, the encapsulation material is exposed with the UV light in a sufficient amount to prevent the non-hardening. The easiest method for exposing the encapsulation material with the light having sufficient amount is to increase the intensity of the light exposure device. However, in this case, an additional light exposure device must be applied, and the alignment layer or the liquid crystal may be deteriorated by the light of the high intensity. Therefore, the structure of the LCD device in accordance with the present invention, particularly the structure of the injection opening of the LCD device is differently designed from the conventional one to allow the exposure of the encapsulation material to a sufficient amount with a light exposure device as in the related art.

In the present invention, particularly, the black matrix and step compensating pattern for blocking the light are formed in the different shape from the in the related art shape to prevent the non-hardening of the encapsulation material. Hereinafter, the present invention will be descried in more detail with reference to the accompanied drawings.

Figure 5:
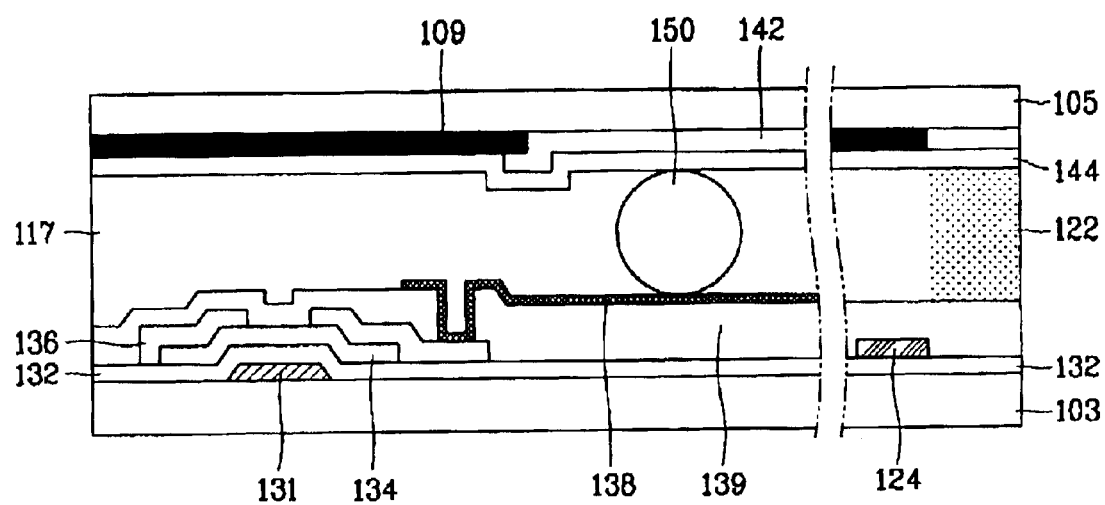
FIG. 5 is a view illustrating a structure of a pixel region and liquid crystal injection opening area of an LCD device in accordance with the present invention.

Referring to FIG. 5, an LCD device in accordance with the present invention has the structure similar with the related art LCD device. That is, the pixel region of the LCD device according to the present invention is same as that of the conventional LCD device. The present invention is not about the structure of the LCD device, actually, but about the improved structure of the liquid crystal injection opening in the LCD device. Therefore, the structure of the liquid crystal injection opening will be described here. Other structure similar to the structure of the related art LCD device is omitted.

As shown in FIG. 5, the liquid crystal injection opening area of the LCD device according to the present invention is described with respect to two regions. The first region is a region where the step compensating pattern 124 and black matrix 109 are formed respectively on the lower substrate 103 and upper substrate 105. The second region is a region where the step compensating pattern 124 and black matrix 109 are not formed.

The encapsulation material 122 is filled only in the second region through the liquid crystal injection opening. In other words, the black matrix 109 and step compensating pattern 124 are formed only in the region where the encapsulation material 122 is not filled (This region is the first region). As described above, the photo-sensitive encapsulation material 122 is filled only in the second region such that it can be exposed with a sufficient amount of light. Since about 300 mj/cm$^2$ of light amount is necessary to harden the encapsulation material 122, the preferable amount of light can be radiated onto the encapsulation material 122 if the black matrix 109 or the step compensating pattern 124 does not block the light onto the encapsulation material 122.

The black matrix 109 is formed in the liquid crystal injection opening area to solve the problem that the image quality is reduced because of light transmitted to the display region. The step compensation pattern is formed in the liquid crystal injection opening area to solve the problem that the cell gap is changed by the step. Therefore, in case the black matrix 109 and step compensating pattern 124 are not formed as the present invention, a problem that the light is transmitted to the region in which the black matrix 109 and step compensating pattern 124 are not formed may be raised (the cell gap does not matter since it is maintained uniformly by the pattern actually formed in the other region).

When the liquid crystal panel is mounted inside the case to complete the LCD device, on the other hand, the most area of the panel is exposed through a window of the case except a part of the outer area of the panel attached to the inside of the case. In other words, since a part of the screen, i.e., a part of outer area of the panel, is shielded, the size of the screen is smaller than that of the panel.

Since the light transmission of the outer area of the panel which is attached by the outer case is blocked by the case, the region is not actually displayed on a screen. Therefore, the light leakage phenomenon caused by the light transmission does not occur even if the black matrix 109 is not formed in this region. In this region, therefore, defects of the LCD device, the image quality deterioration, does not occur even without the additional black matrix. In the present invention, this region is the second region shown in FIG. 5. The encapsulation material 122 is filled only in the second region, not in the first region. As described above, since the black matrix 109 or the step compensating pattern 124 is not disposed in the second region where the encapsulation material 122 is filled, the encapsulation material 122 is perfectly hardened by exposing with the light having the sufficient amount and the light leakage phenomenon can be prevented by the attached outer case.

The second region, that is, the region adjacent to the case can be varied according to the size of the liquid crystal panel. In case of the LCD device used for the notebook or the television, this region has the width of about 1 mm. However, the size of this region can be varied according to the size of the liquid crystal panel or the mounting condition of the panel on the case, etc., and is not limited in certain size.

In the present invention, as described above, the liquid crystal injection opening area is divided into a region where the step compensating pattern 124 or black matrix 109 is formed and the region mounted inside the case where the step compensating pattern 124 or black matrix 109 is not formed. The encapsulation material 122 is filled only in the region where the step compensating pattern 124 or black matrix 109 is not formed. Therefore, a light blocking phenomenon by the step compensating pattern 124 or black matrix 109 can be prevented so that the encapsulation material 122 is perfectly hardened by the sufficient amount of light. Further, a phenomenon that the encapsulation material 122 is cracked along the step compensating pattern 124 can be prevented.

Figure 6A:
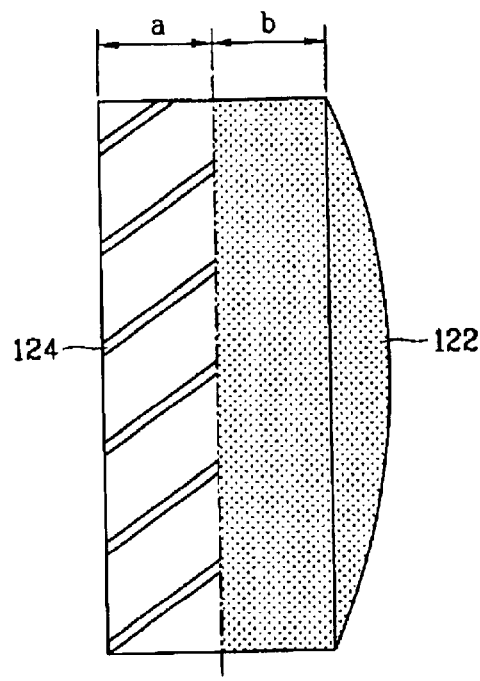
FIG. 6 is a enlarged plan view illustrating the region of the liquid crystal injection opening of the LCD device in accordance with the present invention.
Figure 6B:
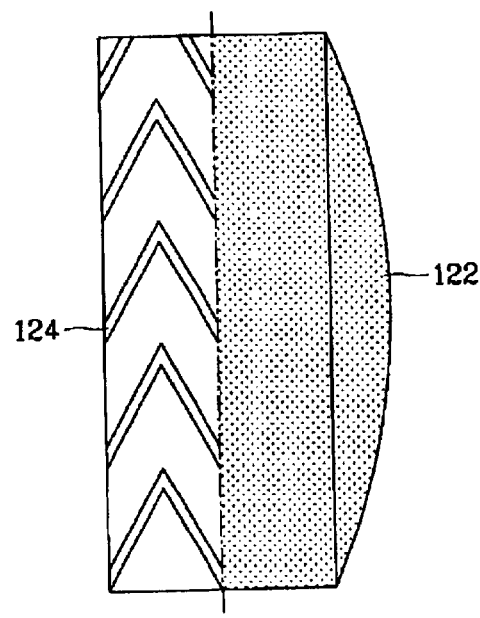

The step compensating pattern 124 in the first region of the liquid crystal injection opening area can be formed in various shapes. FIGS. 6A and 6B illustrate a step compensating patterns 124 formed in the liquid crystal injection opening area. As shown in the figures, the liquid crystal injection opening area is divided into two regions respectively having widths of a and b. The left region is a displaying area and includes the step compensating pattern 124, and the right region is the area shielded by the case and filled with the encapsulation material 122 to be hardened by the light exposure.

The step compensating pattern 124 can be made of various materials. For instance, in case of forming with a semiconductor material, as shown in FIG. 5, the step compensating pattern 124 can be formed by the same process of the semiconductor layer of the TFT in the pixel region of the LCD device. In case of forming with a metal, the step compensating pattern 124 can be formed by the same process of the gate electrode and the source/drain electrode of the TFT. Also, the step compensating pattern 124 can be formed with one or more layers.

Further, the step compensating pattern 124 is not limited to a specific shape. Any shape may be possible as shown in FIGS. 6A and 6B, as long as the structure can compensate the step of the LCD device.

In the present invention, as described above, the liquid crystal injection opening area is described as into the first region and the second region. The division of the two regions is determined according to where the black matrix and step compensating pattern are formed, but can be determined according to whether the encapsulation material is filled in the liquid crystal injection opening. These divisions can have a same meaning, but also can have different meanings. In case of dividing the region based on the fill of the encapsulation material, an important point of the second region is not on whether the black matrix and step compensating pattern are formed but on whether the encapsulation material is filled. Therefore, in this point, it is not an essential condition that the black matrix and step compensating pattern are not formed in the second region, but that the filled encapsulation material can be effectively hardened. The second region can be formed in any structure that can effectively harden the encapsulation material. For instance, the structure in which the black matrix is formed but the step compensating pattern is not in the second region and the structure in which the step compensating pattern is formed, but the black matrix is not, can be good embodiments of the present invention, because the encapsulation material can be effectively hardened.

As described above, in the present invention, the liquid crystal injection opening to which the liquid crystal is injected is described as the first region, where the black matrix and the step compensating pattern are both formed and as the second region where the two are not formed. The encapsulation material is filled only in the second region where the black matrix and step compensating pattern are not formed and is irradiated and hardened. Therefore, the encapsulation material can be completely hardened by irradiating sufficient amount of light. Also, since the second region is formed in the region that the liquid crystal panel is attached with the outer case in which the liquid crystal panel is mounted, light leakage phenomenon caused by non-formation of the black matrix can be prevented in the present invention.

As described above, in the present invention, the encapsulation material is filled and hardened only in the injection opening area where the black matrix and step compensating pattern are not formed to prevent defects caused by non-formation of the encapsulation material. A photo-sensitive resin may be used as the encapsulation material, but such encapsulation material is not limited to a specific product or property. Any encapsulation material may be possible if the material is made of substances that can encapsulate the liquid crystal injection opening and be curable by exposure to light irradiation. Also, the size of the region where the encapsulation material is filled or shape of the step compensating pattern can be formed in any shapes.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    first and second substrates including a plurality of pixel regions and liquid crystal injection opening area having first and second regions;
    a liquid crystal layer between the first and second substrates;
    a thin film transistor in respective pixel regions of the first substrate;
    a color filter layer formed in respective pixel regions of the second substrate; a black matrix on the second substrate to shield light passing through non-displaying area of the pixel regions and the first region of the liquid crystal injection opening area; and
    an encapsulation material filled only in a second region of the liquid crystal injection opening area between the first and second substrates having no black matrix, the encapsulation material being hardened to encapsulate the liquid crystal injection opening.

2. The device of claim 1, further comprising a case mounting the first and second substrates.

3. The device of claim 2, wherein the second region of the liquid crystal injection opening area is disposed under the case to block the encapsulation material from light.

4. The device of claim 1, further comprising a step compensating pattern disposed in the first and second regions of the liquid crystal injection opening area on the first substrate to compensate a step on the first substrate.

5. The device of claim 1, further comprising a step compensating pattern disposed in the first region of the liquid crystal injection opening area on the first substrate to compensate a step on the first substrate.

6. The device of claim 1, wherein the thin film transistor includes:
    a gate electrode on the first substrate;
    a gate insulating layer deposited over the lower substrate;
    a semiconductor layer formed on the gate insulating layer; and
    a source/drain electrode on the semiconductor layer.

7. The device of claim 6, wherein the step compensating pattern is made of a substantially same material as that of the semiconductor layer.

8. The device of claim 6, wherein the step compensating pattern is made of a substantially same material as that of the gate electrode or source/drain electrode.

9. The device of claim 1, wherein the encapsulation material is a photo-sensitive resin.

10. A liquid crystal display device, comprising:
    first and second substrates having a plurality of pixel regions in which a thin film transistor is disposed in a pixel region, liquid crystal being injected between the first and second substrates through an injection opening structure,
    wherein the injection opening structure includes first and second regions, only the first region having a black matrix to block light and only the second region under an outer case being having encapsulation material to be hardened,
    wherein the first and second region do not overlap.

11. The device of claim 10, further comprising a step compensating pattern for compensating a step of the substrate is disposed in the first region.

* * * * *